No. 877,163. PATENTED JAN. 21, 1908.
G. B. BIBOLINI & C. BAULINO.
MEANS FOR RECOVERING AND REGENERATING LUBRICATING OILS
OF MARINE ENGINES.
APPLICATION FILED NOV. 11, 1904.
3 SHEETS—SHEET 1.
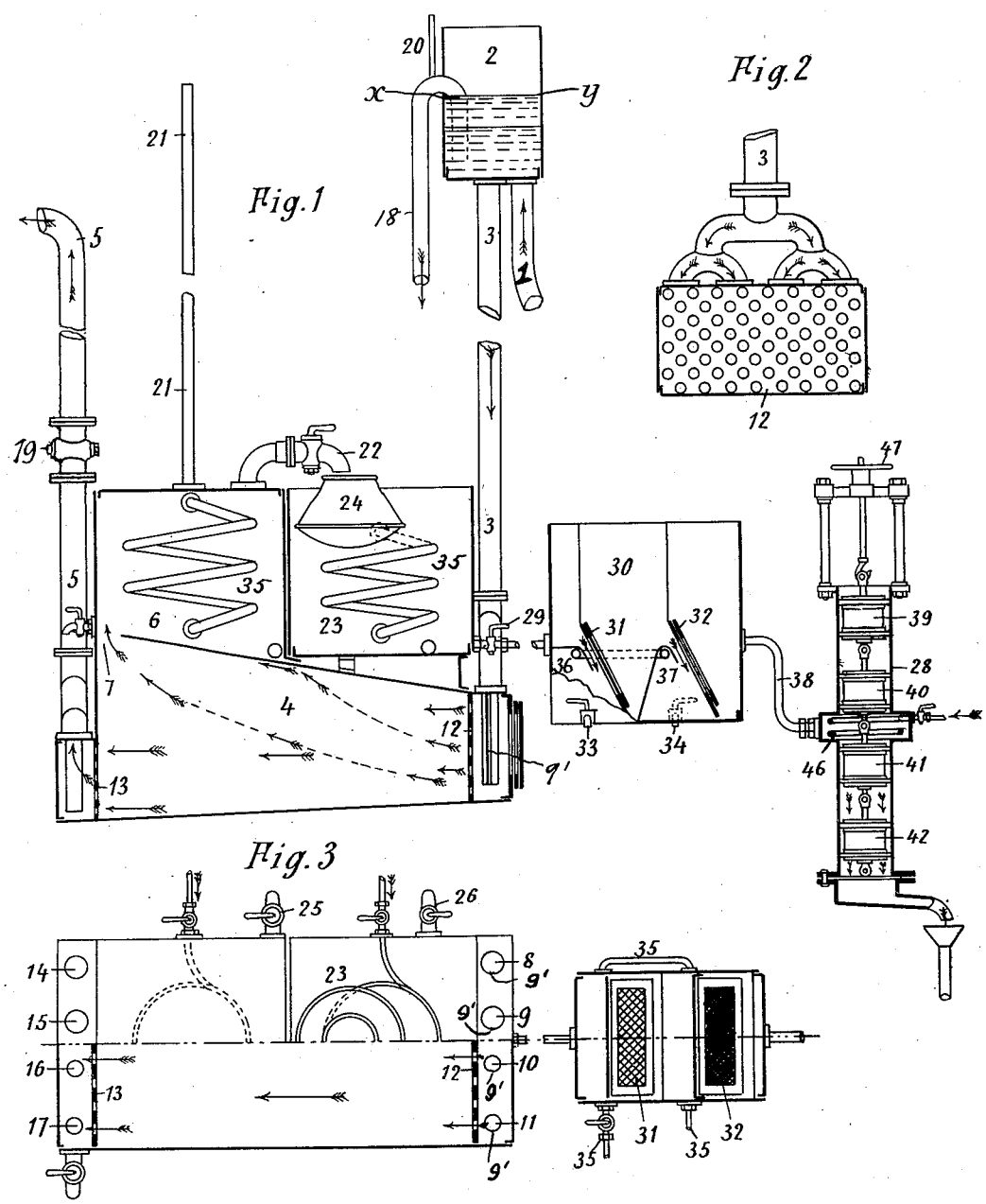

No. 877,163. PATENTED JAN. 21, 1908.
G. B. BIBOLINI & C. BAULINO.
MEANS FOR RECOVERING AND REGENERATING LUBRICATING OILS
OF MARINE ENGINES.
APPLICATION FILED NOV. 11, 1904.

3 SHEETS—SHEET 2.

Witnesses:
C. L. McVay
S. R. Cass

Inventors
G. B. Bibolini
C. Baulino
by Niedersheim Fauhautes
Attorneys.

No. 877,163. PATENTED JAN. 21, 1908.
G. B. BIBOLINI & C. BAULINO.
MEANS FOR RECOVERING AND REGENERATING LUBRICATING OILS
OF MARINE ENGINES.
APPLICATION FILED NOV. 11, 1904.

3 SHEETS—SHEET 3.

UNITED STATES PATENT OFFICE.

GIOVANNI BATTISTA BIBOLINI AND CARLO BAULINO, OF TARANTO, ITALY.

MEANS FOR RECOVERING AND REGENERATING LUBRICATING-OILS OF MARINE ENGINES.

No. 877,163.       Specification of Letters Patent.       Patented Jan. 21, 1908.

Application filed November 11, 1904. Serial No. 232,279.

*To all whom it may concern:*

Be it known that we, GIOVANNI BATTISTA BIBOLINI and CARLO BAULINO, engineers, subjects of the King of Italy, residing at Taranto, in the Kingdom of Italy, have invented certain new and useful Improvements in Means for Recovering and Regenerating Lubricating-Oils of Marine Engines; and we do declare the following to be a full, clear, and exact description of the invention, such as will enable others skilled in the art to which it appertains to make and use the same.

The apparatus which forms the object of this invention serves for recovering and regenerating the oil which after having been used for lubricating the parts of marine engines falls into the well mixed with the water.

The apparatus comprises two parts, one of which serves to retain the oily substance contained in the water which is extracted from the well, and the other to purify this substance, restoring to it its original lubricating properties.

The first part of the apparatus is based upon the natural separation of water and oil owing to their difference of density. This principle is utilized by causing the mixture of oil and water to move while distributed in the form of one or more horizontal layers of inconsiderable height and presenting a very small velocity.

The second part of the apparatus is on the contrary based upon the property presented by an emulsion of oil and water, when heated to 70° C. of speedily freeing itself from the water and of filtering directly through suitably arranged diaphragms of metallic gauze or other appropriate material, of very fine mesh and through layers of carded cotton.

Figure 4:
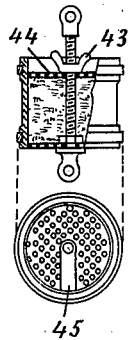
Figure 5:
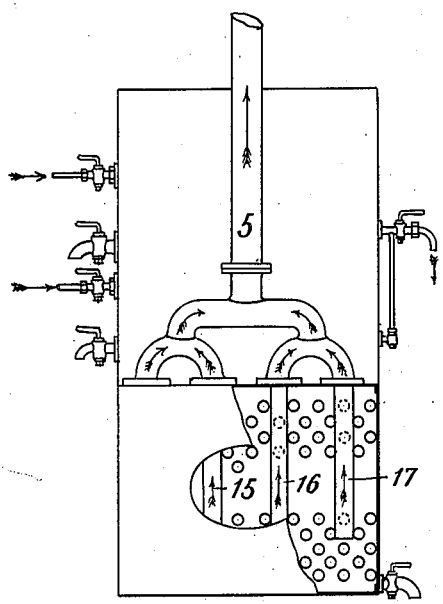
Figure 6:
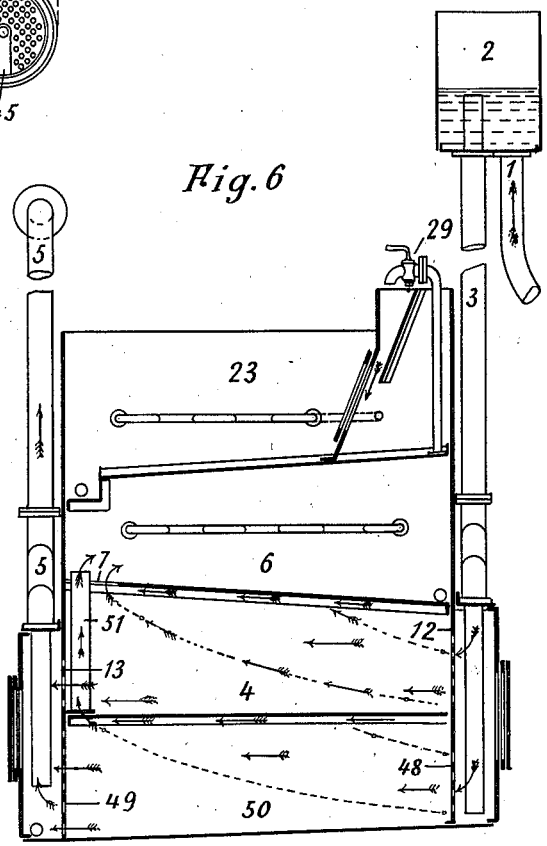
Figure 7:
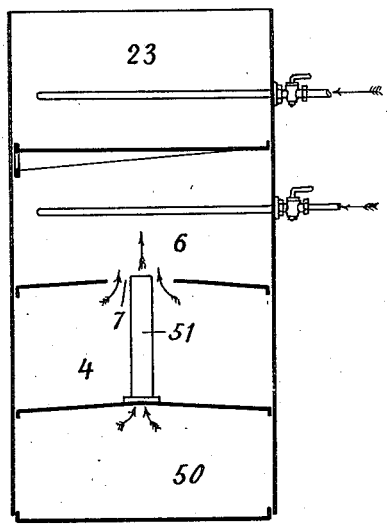
Figure 8:
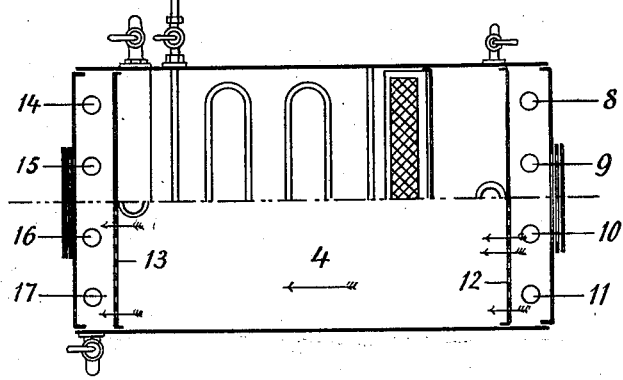

Referring to the accompanying drawings:—Figure 1 represents the two parts of the apparatus combined, with purifier and filter. Fig. 2 is a side elevation of the perforated diaphragm and the branched feed pipes. Fig. 3 is a plan view of the apparatus with parts removed. Fig. 4 represents a section through the boxes filled with carded cotton. Fig. 5 is a side elevation of a modified form of the apparatus. Fig. 6 is a longitudinal section through the same. Fig. 7 is a second side elevation. Fig. 8 is a plan view.

The two portions of the apparatus being connected as shown in Fig. 1, the method of operation is as follows:—

The well pump of the vessel sucks a mixture which is broadly speaking composed of water, oil and air, and delivers it through the pipe 1, to the open vessel 2, where the separation of the air takes place. The remainder of the mixture consisting of oil and water passes through the pipe 3 into the horizontal tank 4 through which it passes from right to left. On entering this tank the mixture encounters a passage of very large cross section, its velocity accordingly becomes small thus causing it to remain in the apparatus for a sufficient time for the oil to separate from the water which travels horizontally.

The water freed from the oil passes out through the pipe 5 and is discharged overboard above the water line; the oil on the other hand collects in the accumulator reservoir 6 passing through the openings 7.

The pipe 3 separates at its lower part into four vertical branches 8, 9, 10 & 11, (Fig. 3) which are provided with longitudinal slots 9′ through which the liquid enters the fore part of the the tank in a subdivided condition. Opposite these pipes is arranged a diaphragm 12 of perforated sheet metal the perforations being about 20 millimeters in diameter and of regular distribution; through these holes the liquid enters the tank, distributing itself uniformly through all points of the cross section of the inlet. The opening through which the water leaves the apparatus is also provided with a diaphragm 13 likewise perforated and serving to prevent the formation of a strong current in the body of the liquid owing to the action exerted by the discharge pipe 5, as otherwise oil might be carried outside the apparatus. The pipe 5 also separates at its lower part into four vertical pipes 14, 15, 16 and 17 (Fig. 3). The movement of the liquid in the apparatus is therefore determined by the difference of level between the upper extremities of the pipes 3 and 5. This arrangement has been adopted in order that, in the tank where the separation of the liquids takes place, the effects of the movement of the well pump may be insensible so that the mixture may travel uniformly and free from perturbations. Owing to this same arrangement air is prevented from entering the tank and occupying the place reserved for the oil.

As well pumps are generally very powerful, cases may occur, more particularly at the commencement of their action in which the quantity of water sucked in a unit of time is greater than the capacity of the apparatus, which would diminish its efficiency. These defects are guarded against by the adoption of the following arrangement: From the vessel 2 proceeds a pipe 18 which discharges water into the well when the water has attained a level $xy$ in the vessel; in addition to this the pipe 5 for discharge overboard is provided with a cock 19 which should be regulated in such a manner that when the liquid in the vessel 2 attains the level $xy$, the maximum quantity of water compatible with its dimensions passes into the apparatus. It is therefore obvious that when the well pump delivers to the vessel 2 a larger quantity of water than that provided for, the level will exceed the limit $xy$ of the pipe 18 which is bent in such a manner as to reach the bottom of the vessel 2 so as to prevent the oil from returning with the water into the well, and in order that the said pipe may not exert a siphon action a small pipe 20 branches off from its summit.

The reservoir 6 in which the oil accumulates is provided internally with a coil traversed by a small quantity of steam which maintains the oily substance at a temperature of about 60° C.; as a consequence it remains very fluid and becomes partially freed from the water and heavier impurities which it holds in suspension. This reservoir may be either closed or open at its upper part; if it is closed as shown in Fig. 1 a pipe 21 may advantageously be adapted to the cover so as to afford an outlet for the air which it carries into the apparatus although in very small quantities; if it is open it is obvious that its edge should be higher than the summit of the discharge pipe 5 in order to prevent the oil from flowing into the reservoir. The reservoir may be of large capacity in order that it may contain all the oil recovered during 14 hours of operation. In this case, the oily substance is extracted each day by means of the cock 22 and collected in the vessel 23; but before entering this vessel it passes through the filter 24 of any suitable construction which presents the form of a truncated cone and is constituted of metallic gauze of very fine mesh, the bottom upon which the impurities are deposited being of sheet metal.

The oily substance being very fluid owing to its preliminary heating, readily filters through the metallic network and does not clog. The heterogeneous substances fall and collect upon the bottom of the filter. It is then raised to a temperature of about 70° by means of a steam coil and then allowed to rest for some hours. During this interval of time it becomes entirely free from water which is extracted through cocks 25, and 26 (Fig. 3) after which it is conducted to the cotton filter 28 the cock 29 being left open.

In case there may be an accumulation of impurities in the well of the ship such as cinders, coal dust or the like, it is well to cause the oil to pass through the purifier 30. This purifier consists of a tank of rectangular section divided into compartments with two or more inclined diaphragms 31, 32 formed of screens of very fine mesh and arranged in increasing order of fineness. The movement of the oil takes place from left to right and the foreign bodies retained by the diaphragms cannot remain adherent owing to their inclination on the side on which the oil reaches them, so that they fall and collect upon the bottom of the tank from which they are withdrawn through the cocks 33 and 34. The rapidity of filtration is insured by invariably maintaining the oil heated by means of the coil 35.

In order to facilitate detachment of the impurities from the diaphragms 31, 32 suitably curved plates 36, 37 are arranged as shown so that the stream of oil is caused to pass along the diaphragms 31 and 32 from top to bottom. The oil thus depurated proceeds to the filter 28 passing through the pipe 38; this filter consists of a vertical pipe in which are arranged four cylindrical boxes 39, 40, 41 and 42 connected one with the other by means of hooks and provided upon their periphery with packings adapted to form a hermetic joint with the inner surface of the pipe.

The bottoms of the boxes are perforated and they are filled with carded cotton which may advantageously be compressed by means of winged nuts 43 (Fig. 4) which exert pressure upon a perforated movable disk 44 provided with slots 45 for facilitating the application. The vertical cylinder is provided half way of its height with a chamber in which a steam coil is placed.

The oil which has reached the filter becomes heated by its contact with the coil 46, filters successively through the cotton contained in the boxes 41, 42 and leaves the lower part of the apparatus completely purified.

When it is considered that the cotton contained in the box 41 has exhausted its filtering power, a box containing clean cotton is added at the lower part of the cylinder and by operating the small hand wheel 47 the whole series of vessels is caused to rise so that the filter 42 comes into the position occupied by 41 and the recently added box in the place of 42, whereupon the box 39 is removed.

It has already been stated that in order to obtain good results from the apparatus the mixture of oil and water must remain in the tank 4 for a sufficient length of time for the oil to separate completely from the water by rising to the upper part of the tank. This result is obtained by making the dimensions of this tank proportionate to the quantity of water which it is intended should pass through it in a unit of time.

When once the volume of water is known, it is only necessary to give the tank a cross section large enough for the liquid to move in it at a low velocity, and such a length that if traversed at this velocity the necessary time is occupied. If, however, the quantity of water to be extracted per hour is very large, it will be readily understood that this tank would necessarily become of unwieldy dimensions both as regards length and width, and consequently the construction of the apparatus would entail difficulties, more especially if the space available is limited, as is most frequently the case on board ship.

It should be noted that the time required for the separation of the oil is dependent upon the height of the stratum of water that it has to traverse, so that the smaller this height is the more rapidly will the separation take place.

It follows that if it is desired to diminish the length of the apparatus it is only necessary to construct the tank 4 of less height. In operating in this manner the dimensions of the apparatus as regards width would be increased, but this may easily be remedied by giving to the apparatus the form represented in Figs. 5, 6, 7 and 8, that is to say by composing it of a number of superposed tanks the length and width of which is limited and their height small, their cumulative section being such that the liquid may acquire the desired velocity.

In Fig. 6, 2 represents the vessel in which the separation of the air takes place; 3 is the pipe which conducts the mixture of oil and water to the apparatus, 12 and 48 are the diaphragms provided with perforations, through which the mixture enters the compartments 4 and 50; 13 and 49 are the perforated diaphragms applied to the discharge aperture. While the mixture passes through the compartments in the horizontal direction and with small velocity, the separation of the oil which collects in the upper part of each of them and the depurated water is discharged through the pipe 5 into the sea. The oil which is separated continuously in the compartments 4 and 50 rises through the opening 7 and the conduits 51 into the reservoir 6 from which it is extracted by means of the cock 29 (Fig. 6) and collected in the reservoir 23. In these two vessels it is heated to a temperature of about 70° C. and submitted to a preliminary depuration; it then passes to the cotton filter where it becomes completely purified.

The apparatus which forms the object of this invention serves not only for recovering oil from a ship's well, but also for separating the oil contained in the feed water coming from the condensers of the engines and generally speaking for separating two liquids of different densities which are mixed together.

Having now particularly described and ascertained the nature of the said invention and in what manner the same is to be performed, we declare that what we claim is:

1. In an apparatus of the character stated, the combination of a receptacle, a supply therefor, means for retarding the velocity of the oil in its passage through said receptacle, a purifier having compartments with screens of varying mesh, and an accumulator.

2. In an apparatus of the character stated, the combination of a receptacle, a supply therefor, means for retarding the velocity of the oil in its passage through said receptacle, a purifier having compartments with inclined screens of varying mesh, an accumulator and means for heating said accumulator.

3. In an apparatus of the character stated, the combination of a receptacle, a supply therefor, means for retarding the velocity of the oil in its passage through said receptacle, a purifier having compartments with inclined screens of varying mesh, an accumulator, means for heating said accumulator and a vessel above said receptacle connected with said accumulator.

4. In an apparatus of the character stated, the combination of a receptacle, a supply therefor, means for retarding the velocity of the oil in its passage through said receptacle, a purifier having compartments with inclined screens of varying mesh, an accumulator, means for heating said accumulator, a vessel above said receptacle connected with said accumulator and a filter in said vessel.

5. In an apparatus of the character stated, the combination of a receptacle, a supply therefor, means for retarding the velocity of the oil in its passage through said receptacle, a purifier having compartments with inclined screens of varying mesh, an accumulator, means for heating said accumulator, a vessel above said receptacle connected with said accumulator, a filter in said vessel and a heating coil in said vessel.

6. In an apparatus of the character stated, the combination of a vessel, a second vessel connected therewith and in communication with the atmosphere, means for retarding and keeping uniform and tranquil the flow of oil and water mixture at all points of its passage through the first-named vessel, an accumulator or collector, means for heating the same and a purifier having screens.

7. In an apparatus of the character stated, the combination of a vessel, a second vessel connected therewith and in communication with the atmosphere, means for retarding and keeping uniform and tranquil the flow of oil and water mixture at all points of its passage through the first named vessel, an accumulator, a coil within the same for heating it and a purifier having compartments with inclined screens of different mesh, and curved guiding plates for causing the oil to be retained in contact with said screens.

In testimony whereof we have hereunto set our hands in presence of two subscribing witnesses.

G. BATTISTA BIBOLINI.
CARLO BAULINO.

Witnesses:
RAIMOND BATTI,
EDW. STORY.